(12) United States Patent
Matsui et al.

(10) Patent No.: US 9,939,986 B2
(45) Date of Patent: Apr. 10, 2018

(54) SCREEN TRANSFER CONTROL SYSTEM, COMPUTER-READABLE RECORDING MEDIUM, AND SCREEN TRANSFER CONTROL METHOD

(71) Applicant: FUJITSU LIMITED, Kawasaki-shi, Kanagawa (JP)

(72) Inventors: Kazuki Matsui, Kawasaki (JP); Tomoharu Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/131,701

(22) Filed: Apr. 18, 2016

(65) Prior Publication Data

US 2016/0370969 A1    Dec. 22, 2016

(30) Foreign Application Priority Data

Jun. 16, 2015 (JP) ................................. 2015-121203

(51) Int. Cl.
| | |
|---|---|
| *G06F 3/033* | (2013.01) |
| *G09G 5/08* | (2006.01) |
| *G06F 3/0481* | (2013.01) |
| *G06F 3/14* | (2006.01) |
| *G06F 3/0488* | (2013.01) |

(52) U.S. Cl.
CPC ........ *G06F 3/04812* (2013.01); *G06F 3/1423* (2013.01); *G06F 3/1454* (2013.01); *G06F 3/04886* (2013.01)

(58) Field of Classification Search
CPC ............ G06F 3/04812; G06F 3/04886; G06F 3/1423; G06F 3/1454; H04M 1/7253
See application file for complete search history.

(56) References Cited

U.S. PATENT DOCUMENTS

2006/0095867 A1* 5/2006 Rogalski ............... G06F 3/0481
                                                                  715/858
2014/0156737 A1* 6/2014 Imai ........................ H04W 4/02
                                                                  709/203

FOREIGN PATENT DOCUMENTS

JP          2005-010894          1/2005

* cited by examiner

*Primary Examiner* — Insa Sadio
(74) *Attorney, Agent, or Firm* — Fujitsu Patent Center

(57) ABSTRACT

A screen transfer control system includes a business device performing a business process, a mobile terminal, and a screen transfer control device converting a business screen of the business device to image data and sending the image data to the mobile terminal, the screen transfer control device converting the business screen to the image data on the basis of the drawing command, detecting a change in the cursor shape on the basis of cursor information included in the drawing command, and sending change information, when a change in the cursor shape is detected, to the mobile terminal, the mobile terminal displaying the image data from the screen transfer control device, determining whether the cursor shape is changed on the basis of the change information, and starting up a software keyboard when a screen touch that made the change in the cursor shape continues for a predetermined time.

5 Claims, 10 Drawing Sheets

FIG.3A

| COMMAND ID | IMAGE SIZE (BYTE) | UPDATE COORDINATE POSITION (x, y) | IMAGE DATA |
|---|---|---|---|

FIG.3B

| COMMAND ID | CURSOR POSITION (x, y) | CURSOR IMAGE SIZE (BYTE) | CURSOR IMAGE DATA |
|---|---|---|---|

FIG.3C

| COMMAND ID (E.G., 0x01) | CURSOR POSITION (x, y) | CURSOR IMAGE DATA |
|---|---|---|

SCREEN TRANSFER CONTROL SYSTEM, COMPUTER-READABLE RECORDING MEDIUM, AND SCREEN TRANSFER CONTROL METHOD

CROSS-REFERENCE TO RELATED APPLICATION

This application is based upon and claims the benefit of priority of the prior Japanese Patent Application No. 2015-121203, filed on Jun. 16, 2015, the entire contents of which are incorporated herein by reference.

FIELD

The embodiment discussed herein is related to a screen transfer control system, a computer-readable recording medium, and a screen transfer control method.

BACKGROUND

With the popularization of mobile terminals, such as smartphones, tablets, or the like, and the speed up of mobile communication networks, the use of mobile terminals in business is accelerated. For example, business activities are supported by mobile terminals. Furthermore, the case of bring your own device (BYOD) in which smartphones personally owned are utilized in business is increased.

When mobile terminals are used in business, a mobile solution using a screen transfer system that does not leave data in a terminal has been drawing attention. The screen transfer system that does not leave data in a terminal needs to have only the function in which image data is sent to a terminal and the terminal receives the image data and displays the data. Consequently, the screen transfer system that does not leave data in a terminal is also called a thin client system.

Figure 11:
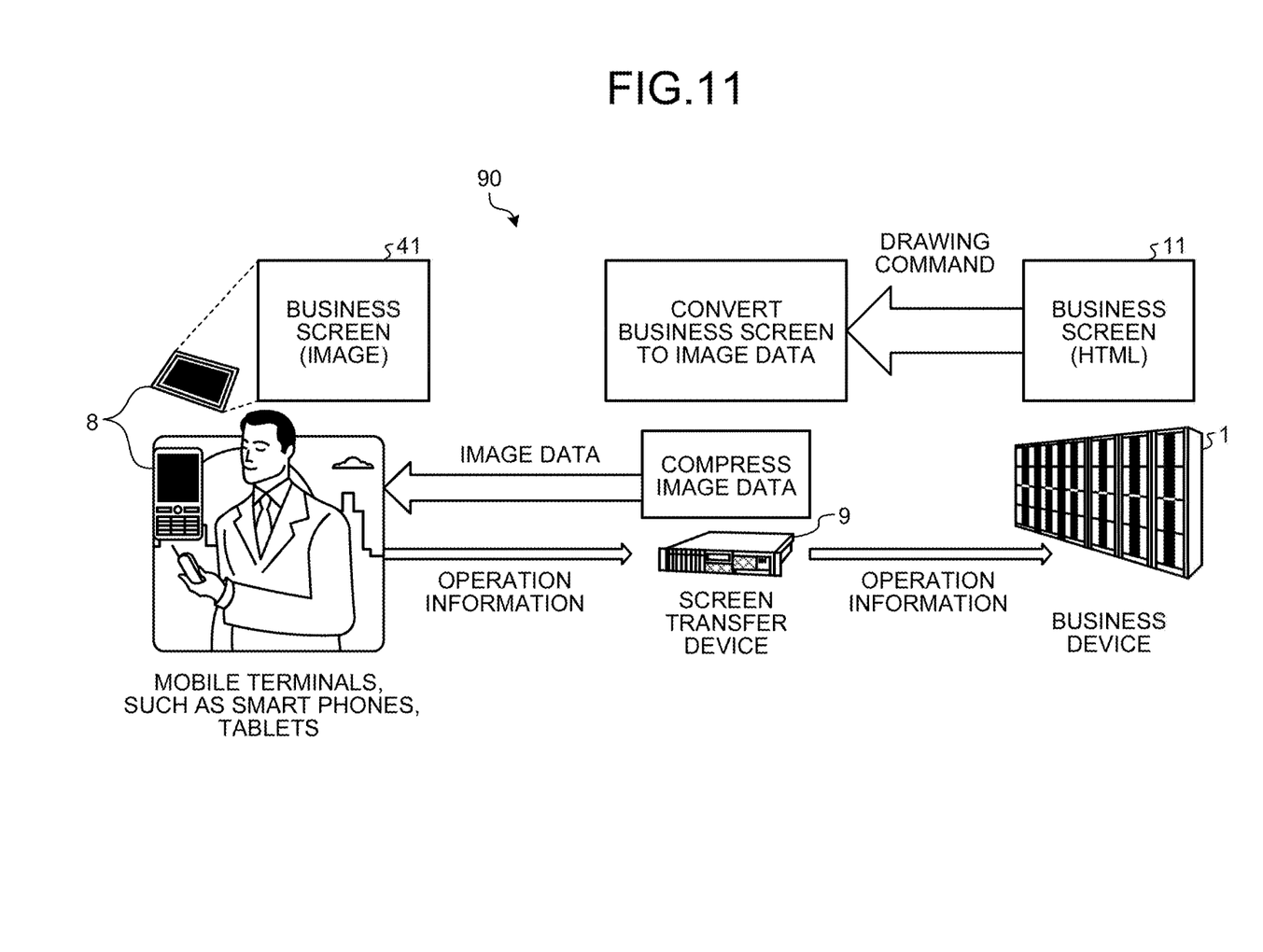
FIG. 11 is a schematic diagram illustrating a screen transfer control system used in a thin client system.

FIG. 11 is a schematic diagram illustrating a screen transfer control system used in a thin client system. As illustrated in FIG. 11, in a screen transfer control system 90 in the thin client system, a business device 1 sends, as a drawing command to a screen transfer device 9, information on a business screen 11 developed for a Personal Computer (PC). The information on the business screen 11 is described in, for example, HyperText Markup Language (HTML).

The screen transfer device 9 converts the business screen 11 to image data on the basis of the drawing command, compresses the image data, and sends the compressed image data to a mobile terminal 8. The mobile terminal 8 displays a business screen 41 on the basis of the image data. Then, if a user performs an operation on the business screen 41, operation information is sent to the business device 1 via the screen transfer device 9 and then the business device 1 updates the business screen 11 on the basis of the operation information.

In this way, the screen transfer control system 90 in the thin client system can be used, from the mobile terminal 8, by the same operation as that performed on a PC without changing a business system that is developed for the PC. Furthermore, because the screen transfer control system 90 used in the thin client system does not send data to the mobile terminal 8, it is possible to prevent leakage of information due to a loss of the mobile terminal 8.

Furthermore, there is a conventional technology in which, regarding an input from the mobile terminal, if a key input field in a display screen in the displaying unit is focused due to an operation of an operating unit, a control unit displays a soft keyboard in a display screen.

Patent Document 1: Japanese Laid-open Patent Publication No. 2005-10894

Figure 12:
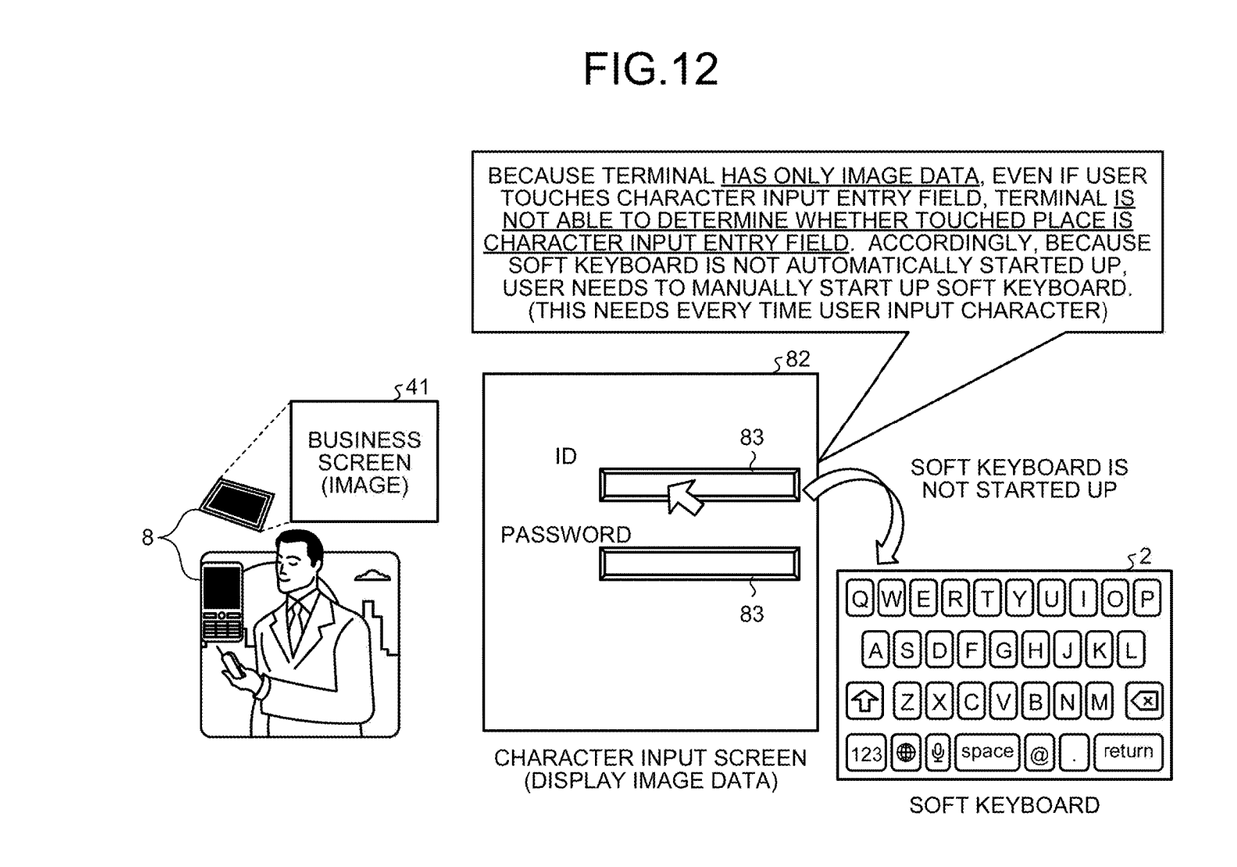
FIG. 12 is a schematic diagram illustrating an issue of a character input in the screen transfer control system used in the thin client system.

However, there is a problem in that, in the screen transfer control system 90 used in the thin client system, if a character input entry field is selected in the mobile terminal 8, a character input is inconvenient for a user who is familiar with the state in which a soft keyboard is started up. FIG. 12 is a schematic diagram illustrating an issue of a character input performed by the screen transfer control system 90 used in the thin client system. FIG. 12 illustrates a case, as an example of the business screen 41, in which a character input screen 82 is displayed on the mobile terminal 8.

Because the mobile terminal 8 has only image data, even if a user touches a character input entry field 83, the mobile terminal 8 is not able to determine whether the touched place is the character input entry field 83. Accordingly, because a soft keyboard 2 is not started up, the user needs to manually start up the soft keyboard 2. The user needs to manually start up the soft keyboard 2 every time the user selects the character input entry field 83 and, if the number of the character input entry fields 83 is great, the load applied to the user is particularly increased.

SUMMARY

According to an aspect of an embodiment, a screen transfer control system includes a business device configured to perform a business process, a mobile terminal configured to be used by a user as an input-output device of the business device, and a screen transfer control device configured to convert a business screen, which is output by the business device, to image data and that sends the image data to the mobile terminal, wherein the screen transfer control device includes a receiving circuit that receives drawing command that is output in order for the business device to display the business screen on the mobile terminal, a first sending circuit that converts, on the basis of the drawing command received by the receiving circuit, the business screen to the image data and that sends the image data to the mobile terminal, a detecting circuit that detects a change in the cursor shape on the basis of cursor information that is included in the drawing command received by the receiving circuit, and a second sending circuit that sends, when a change in the cursor shape is detected by the detecting circuit, change information related to the change to the mobile terminal, and the mobile terminal includes a displaying circuit that receives the image data sent by the first sending circuit and that displays the image data, a first determination circuit that determines, on the basis of the change information sent by the second sending circuit, whether the cursor shape is changed to the cursor shape for a character input, a second determination circuit that determines, when the first determination circuit determines that the cursor shape is changed to the cursor shape for the character input, whether a screen touch that made the change in the cursor shape continues for a predetermined time, and a startup circuit that starts up a software keyboard when the second determination circuit determines that the screen touch continues for the predetermined time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The disclosed technology is not limited to the embodiment.

Figure 1:
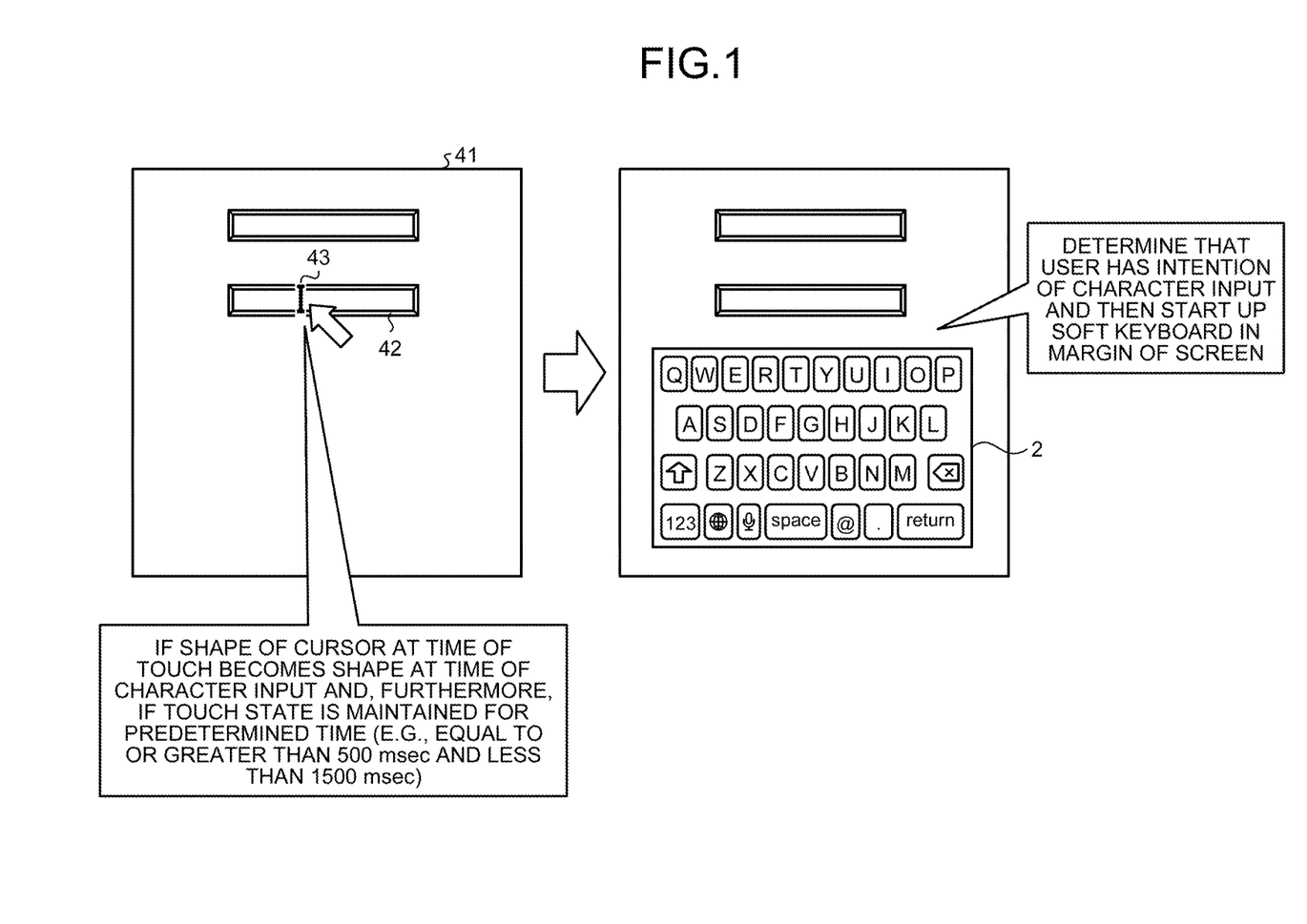
FIG. 1 is a schematic diagram illustrating a startup of a soft keyboard performed by a screen transfer control system according to an embodiment.

First, a startup of a soft keyboard performed by a screen transfer control system according to an embodiment will be described. FIG. 1 is a schematic diagram illustrating a startup of a soft keyboard performed by the screen transfer control system according to the embodiment. The screen transfer control system according to the embodiment performs screen transfer by using a thin client system. FIG. 1 illustrates a case in which a user touches a character input entry field 42 in the business screen 41 displayed on a liquid crystal display device in a mobile terminal.

As illustrated in FIG. 1, if a user touches the character input entry field 42 by intending a character input, the shape of a cursor 43 is changed to the shape at the time of the character input. Thus, the screen transfer control system according to the embodiment recognizes the character input performed by a user by detecting that the shape of the cursor 43 is changed from the normal shape to the shape at the time of the character input.

However, even if the user does not intend the character input, the shape of the cursor 43 is changed only when the cursor 43 passes the character input entry field 42. Consequently, the screen transfer control system according to the embodiment determines, in addition to a change in the shape of the cursor 43, if a predetermined time touch state is maintained, that a user has an intention of the character input and then starts up the soft keyboard 2 in the margin of the screen. The predetermined time is, for example, equal to or greater than 500 msec (milliseconds) and less than 1500 msec.

In this way, with the screen transfer control system according to the embodiment, the shape of the cursor 43 is changed to the shape at the time of the character input and, furthermore, if the predetermined time touch state is maintained, the screen transfer control system determines that a user has an intention of the character input and then starts up the soft keyboard 2 in the margin of the screen. Accordingly, the user does not need to manually start up the soft keyboard 2 and thus it is possible to reduce the load applied to the user.

Figure 2:
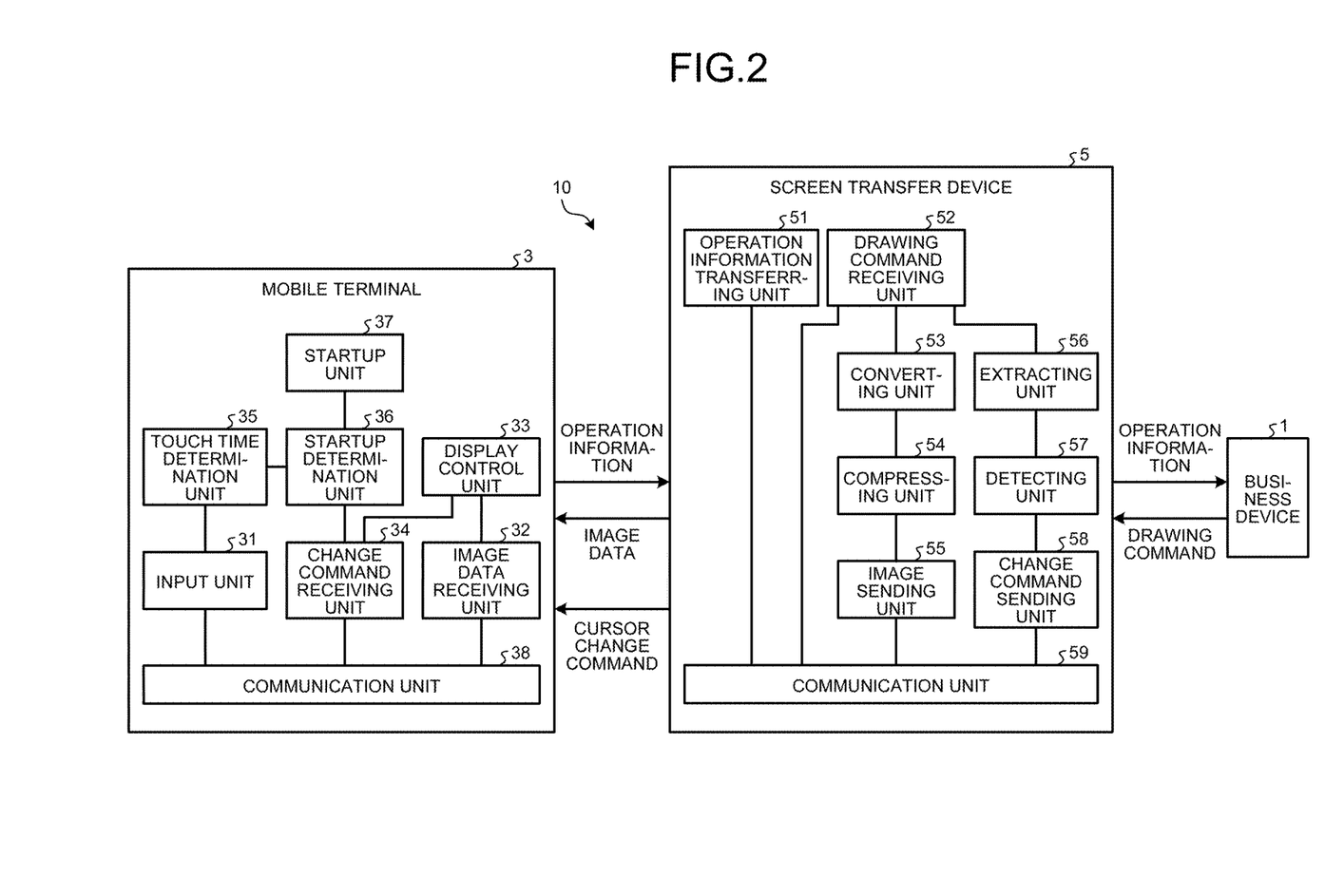
FIG. 2 is a schematic diagram illustrating the configuration of the screen transfer control system according to the embodiment.

In the following, the configuration of the screen transfer control system according to the embodiment will be described. FIG. 2 is a schematic diagram illustrating the configuration of the screen transfer control system according to the embodiment. As illustrated in FIG. 2, a screen transfer control system 10 according to the embodiment includes a business device 1, a mobile terminal 3, and a screen transfer device 5.

The business device 1 is a device that performs a business process and is, specifically, a computer, such as a business server or the like. The mobile terminal 3 is a terminal that is used when a user accesses to the business device 1 by using wireless communication, such as Long Term Evolution (LTE), Worldwide Interoperability for Microwave Access (WiMAX), or the like and is, for example, a tablet or a smartphone. The mobile terminal 3 displays a business screen that is converted to image data.

The screen transfer device 5 is disposed between the mobile terminal 3 and the business device 1, converts a business screen to image data on the basis of a drawing command that is output from the business device 1, and sends the converted image data to the mobile terminal 3. For the drawing command, for example, a Remote Desktop Protocol (RDP), an X-Window protocol, an OpenGL protocol, or the like may be used. Furthermore, the screen transfer device 5 receives, as operation information from the mobile terminal 3, the information related to the operation performed by a user at the mobile terminal 3 and transfers the received information to the business device 1.

The screen transfer device 5 includes an operation information transferring unit 51, a drawing command receiving unit 52, a converting unit 53, a compressing unit 54, an image sending unit 55, an extracting unit 56, a detecting unit 57, a change command sending unit 58, and a communication unit 59.

The operation information transferring unit 51 receives the operation information from the mobile terminal 3 and transfers the received operation information to the business device 1. The operation information transferring unit 51 sends and receives operation information via the communication unit 59. The drawing command receiving unit 52 receives a drawing command from the business device 1 via the communication unit 59 and passes the received drawing command to the converting unit 53 and the extracting unit 56.

The converting unit 53 converts the business screen to image data on the basis of the drawing command and passes the image data to the compressing unit 54. The compressing unit 54 compresses image data and passes the compressed image data to the image sending unit 55.

Figure 3A:
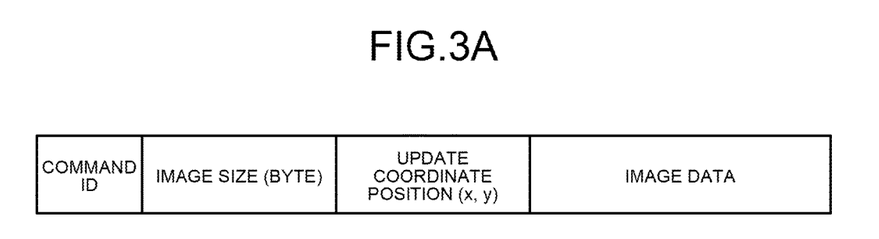
FIG. 3A is a schematic diagram illustrating the data structure of an image data command.

The image sending unit 55 sends the image data compressed by the compressing unit 54 to the mobile terminal 3 via the communication unit 59. FIG. 3A is a schematic diagram illustrating the data structure of an image data command. As illustrated in FIG. 3A, in the image data command, a command ID, an image size, an update coordinate position, and image data are included.

The command ID is an identifier for identifying a command. Here, the command ID is an identifier for the image data command. The image size is the size of image data to be sent and the unit of the size is byte. The update coordinate position is the upper loft of the coordinates (x, y) in the update rectangular image.

Figure 3B:
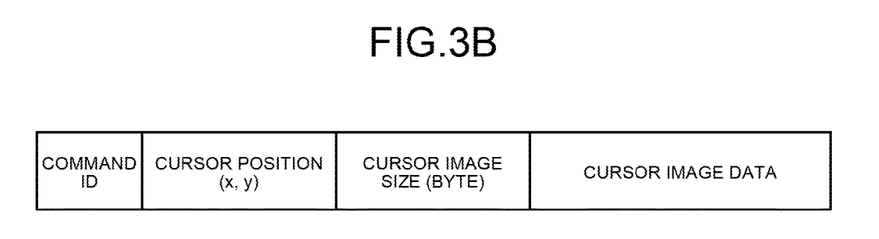
FIG. 3B is a schematic diagram illustrating the data structure of a cursor image data command.

Furthermore, the image sending unit 55 sends a cursor image data included in the drawing command to the mobile terminal 3 via the communication unit 59. FIG. 3B is a schematic diagram illustrating the data structure of a cursor image data command. As illustrated in FIG. 3B, in the cursor image data command, the command ID, the cursor position, the cursor image size, and the cursor image data are included.

The command ID is an identifier for identifying a command. Here, the command ID is an identifier for a cursor image data command. The cursor position is the position in which a cursor is displayed. The cursor image size is the size of cursor image data to be sent and the unit of the size is byte.

The extracting unit 56 extracts cursor information from a drawing command and passes the extracted cursor information to the detecting unit 57. The detecting unit 57 detects a change in the shape of the cursor 43 on the basis of the cursor information and notifies the change command sending unit 58 of the change in the shape of the cursor 43.

Figure 4:
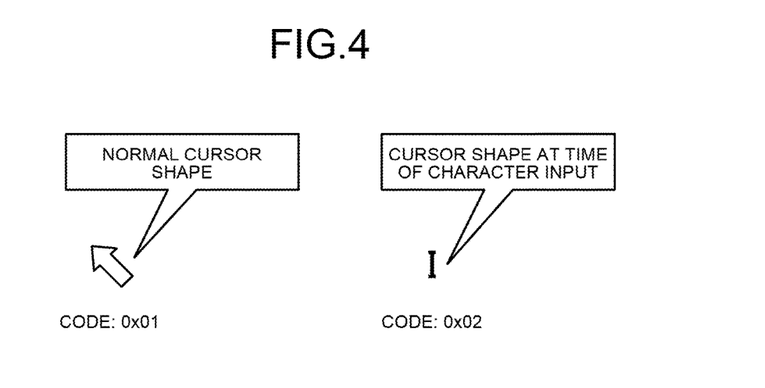
FIG. 4 is a schematic diagram illustrating a change in the cursor shape.

FIG. 4 is a schematic diagram illustrating a change in the cursor shape. FIG. 4 illustrates the normal cursor shape and the cursor shape at the time of the character input. The code associated with the normal cursor shape is 0x01 and the code associated with the cursor shape at the time of the character input is 0x02. Here, "0x" represents the hexadecimal number. The detecting unit 57 detects a change in the shape of the cursor by using a code.

Figure 3C:
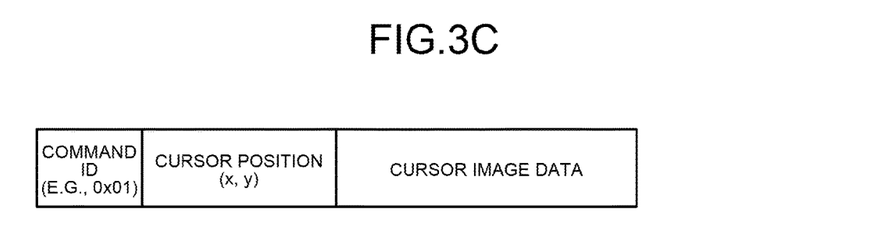
FIG. 3C is a schematic diagram illustrating the data structure of a cursor change command.

When the change command sending unit 58 receives a notification of a change in the shape of the cursor 43, the change command sending unit 58 sends a cursor change command to the mobile terminal 3 via the communication unit 59. FIG. 3C is a schematic diagram illustrating the data structure of a cursor change command. As illustrated in FIG. 3C, in the cursor change command, a command ID, a cursor position, and a cursor image data are included.

The command ID is an identifier for identifying a command. Here, the command ID is an identifier for the cursor change command and, if, for example, 0x01 is indicated, this indicates that the cursor shape is changed to the shape at the time of the character input. The cursor position is the position in which a cursor is displayed. The communication unit 59 controls communication between the business device 1 and the mobile terminal 3.

The mobile terminal 3 includes an input unit 31, an image data receiving unit 32, a display control unit 33, a change command receiving unit 34, a touch time determination unit 35, a startup determination unit 36, a startup unit 37, and a communication unit 38.

The input unit 31 accepts a touch of the screen performed by a user and sends the information related to the accepted touch to the screen transfer device 5 as operation information via the communication unit 38. Furthermore, the input unit 31 passes the touch time to the touch time determination unit 35.

The image data receiving unit 32 receives the image data command from the screen transfer device 5 via the communication unit 38, decompresses the image data included in the received image data command, and passes the decompressed image data to the display control unit 33 together with the update position coordinates. Furthermore, the image data receiving unit 32 receives the cursor image data command from the screen transfer device 5 via the communication unit 38 and passes the cursor image data to the display control unit 33 together with the cursor image data. The display control unit 33 displays the image data and the cursor image data received from the image data receiving unit 32 on the liquid crystal display device.

The change command receiving unit 34 receives the cursor change command from the screen transfer device 5 via the communication unit 38 and passes the cursor image data and the cursor position included in the cursor change command to the display control unit 33. Furthermore, the change command receiving unit 34 passes a change notification about the cursor shape on the basis of the cursor change command to the startup determination unit 36. The touch time determination unit 35 determines whether the touch time received from the input unit 31 is the predetermined time and passes the determination result to the startup determination unit 36.

The startup determination unit 36 determines, on the basis of the change notification about the cursor shape received from the change command receiving unit 34, whether the cursor shape has been changed to the shape at the time of the character input. Then, if the cursor shape has been changed to the shape at the time of the character input, the startup determination unit 36 instructs the startup unit 37 to start up the soft keyboard 2 if the determination result received from the touch time determination unit 35 is positive, i.e., if the touch time is the predetermined time.

If the startup unit 37 receives an instruction to start up the soft keyboard 2 from the startup determination unit 36, the startup unit 37 displays the soft keyboard 2 in the margin of the liquid crystal screen. The communication unit 38 controls the communication with the screen transfer device 5.

Figure 5:
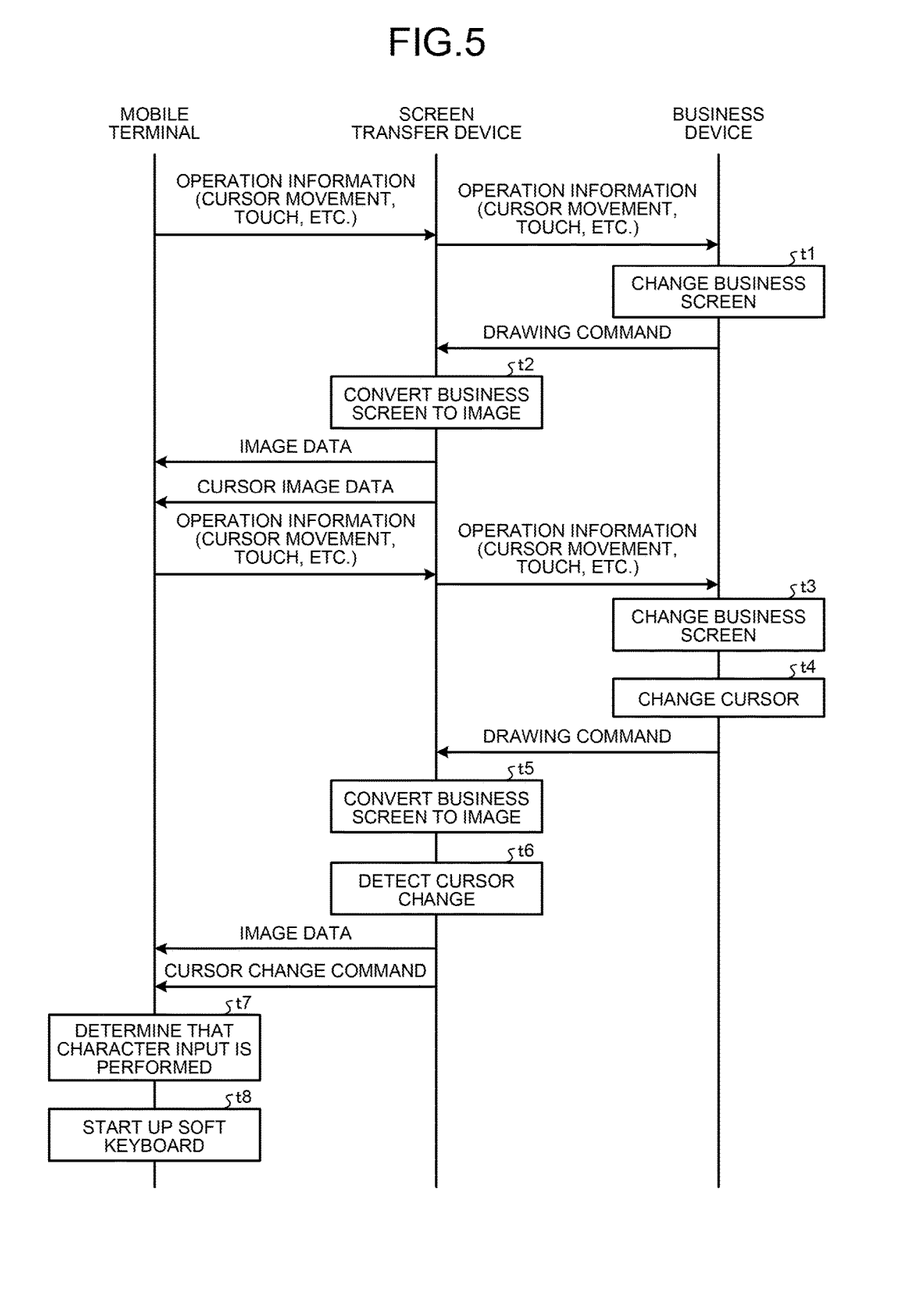
FIG. 5 is a schematic diagram illustrating the sequence of a screen change process.

In the following, the sequence of the screen change process will be described. FIG. 5 is a schematic diagram illustrating the sequence of a screen change process. As illustrated in FIG. 5, the mobile terminal 3 sends the operation information to the screen transfer device 5 and the screen transfer device 5 sends the operation information to the business device 1. Furthermore, examples of the operations include cursor movement, a touch, and the like. Then, the business device 1 updates the business screen (Step t1) and sends the information on the updated business screen to the screen transfer device 5 on the basis of the drawing command. Furthermore, here, it is assumed that the shape of the cursor is not changed.

When the screen transfer device 5 receives the drawing command, the screen transfer device 5 converts the business screen to an image (Step t2), compresses the image data, and sends the compressed image data to the mobile terminal 3. Furthermore, the screen transfer device 5 sends the cursor image data to the mobile terminal 3. The mobile terminal 3 displays the image data and the cursor image data sent from the screen transfer device 5 on the liquid crystal display device.

The mobile terminal 3, the screen transfer device 5, and the business device 1 repeat the processes from the process of sending the operation information performed by the mobile terminal 3 to the process of displaying the cursor image data until the cursor shape is changed. Furthermore, there may be a case in which the position of the cursor is frequently changed and there may be a case in which only the information on the cursor position is sent from the screen transfer device 5 to the mobile terminal 3. The mobile terminal 3 that received only the information on the cursor position updates only the position of the cursor image data.

Then, if the cursor shape is changed on the basis of the operation information sent by the mobile terminal 3, the business device 1 changes the business screen (Step t3) and changes the cursor (Step t4). Then, the business device 1 sends the information on the updated business screen and the cursor shape to the screen transfer device 5 on the basis of the drawing command.

When the screen transfer device 5 receives the drawing command, the screen transfer device 5 converts the business screen to an image (Step t5) and detects that the cursor is changed (Step t6). Then, the screen transfer device 5 compresses the image data and sends the compressed image data to the mobile terminal 3. Furthermore, the screen transfer device 5 sends the cursor change command to the mobile terminal 3. If the mobile terminal 3 determines that the cursor shape has been changed to the shape for a character input and the touch is maintained for the predetermined time, the mobile terminal 3 determines that the intention of the user is a character input (Step t7) and starts up the soft keyboard 2 (Step t8).

In this way, the screen transfer device 5 detects a change in the cursor and sends the cursor change command to the mobile terminal 3, whereby the mobile terminal 3 can start up the soft keyboard 2 on the basis of the cursor change command and the touch time of a user.

Figure 6:
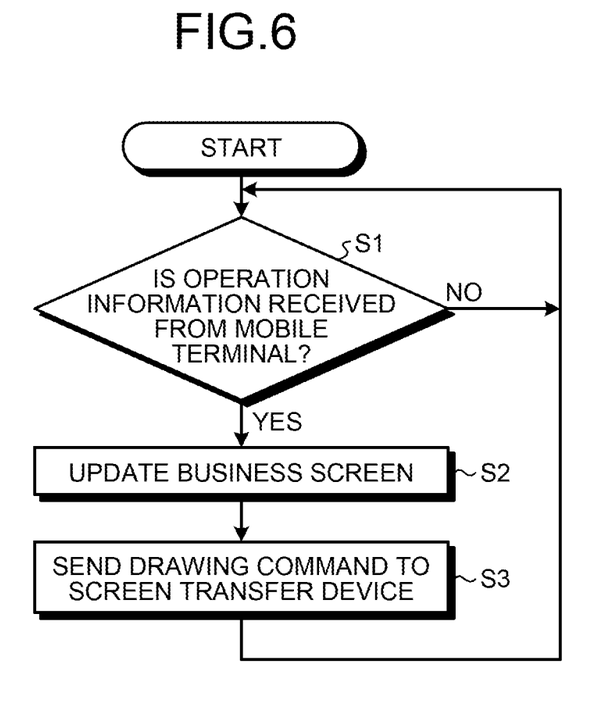
FIG. 6 is a flowchart illustrating the flow of a screen update process performed by a business device.

In the following, the flow of the screen update process performed by the business device 1 will be described. FIG. 6 is a flowchart illustrating the flow of a screen update process performed by a business device. As illustrated in FIG. 6, the business device 1 determines whether the operation information is received from the mobile terminal 3 via the screen transfer device 5 (Step S1) and, if the business device 1 determines that the operation information is not received, the business device 1 repeats the determination until the business device 1 receives the operation information.

Then, if the business device 1 receives the operation information from the mobile terminal 3, the business device 1 updates the business screen on the basis of the operation information (Step S2) and sends the drawing command for displaying the updated business screen to the screen transfer device 5 (Step S3). Then, the business device 1 returns to Step S1.

In this way, by sending the drawing command for displaying the updates business screen to the screen transfer device 5, the business device 1 can update the business screen of the mobile terminal 3.

Figure 7:
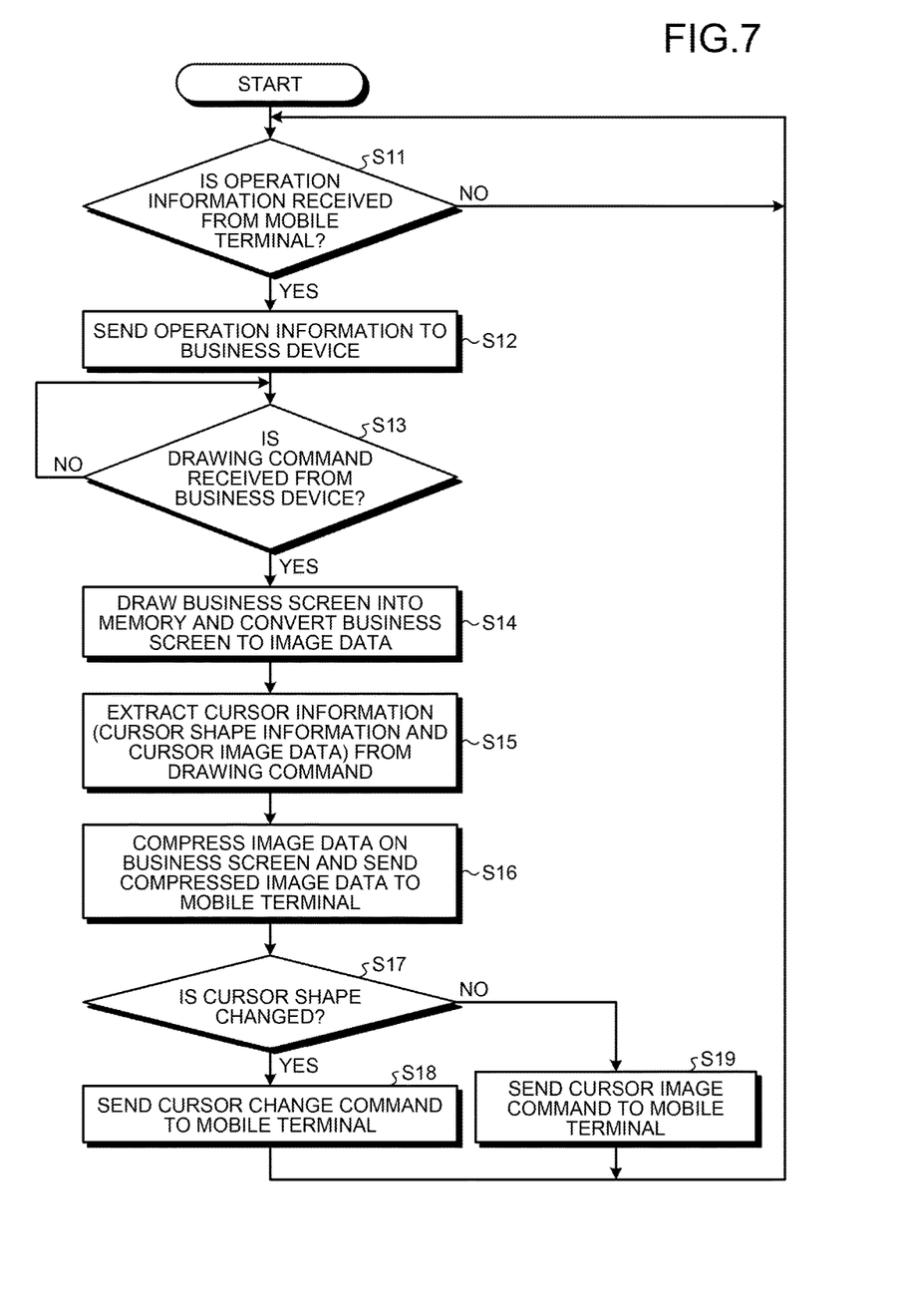
FIG. 7 is a flowchart illustrating the flow of a screen transfer process performed by the screen transfer device.

In the following, the flow of the screen transfer process performed by the screen transfer device 5 will be described. FIG. 7 is a flowchart illustrating the flow of a screen transfer process performed by the screen transfer device 5. As illustrated in FIG. 7, the screen transfer device 5 determines whether the screen transfer device 5 has received the operation information from the mobile terminal 3 (Step S11) and, if the screen transfer device 5 has not received the operation information, the screen transfer device 5 repeats the determination until the screen transfer device 5 receives the operation information.

Then, when the mobile terminal 3 receives the operation information, the screen transfer device 5 sends the operation information to the business device 1 (Step S12). Thereafter, the screen transfer device 5 determines whether the screen transfer device 5 has received the drawing command from the business device 1 (Step S13) and, if the screen transfer device 5 has not received the drawing command, the business device 1 repeats the determination until the screen transfer device 5 receives the drawing command.

Then, when the screen transfer device 5 receives the drawing command from the business device 1, the screen transfer device 5 draws the business screen into a memory on the basis of the drawing command and converts the business screen to the image data (Step S14). Furthermore, the screen transfer device 5 extracts the cursor information from the drawing command (Step S15). Here, in the cursor information, the cursor shape information and the cursor image data are included.

Then, the screen transfer device 5 compresses the image data on the business screen and sends the compressed image data to the mobile terminal 3 (Step S16). Then, the screen transfer device 5 determines, on the basis of the extracted cursor information, whether the cursor shape is changed (Step S17) and, if a change is present, the screen transfer device 5 sends the cursor change command to the mobile terminal 3 (Step S18) and returns to Step S11. In contrast, if a change is not present, the screen transfer device 5 sends the cursor image command to the mobile terminal 3 (Step S19) and returns to Step S11.

In this way, if the cursor shape is changed, the screen transfer device 5 sends the cursor change command to the mobile terminal 3, whereby the mobile terminal 3 can detect a change in the cursor shape.

Figure 8:
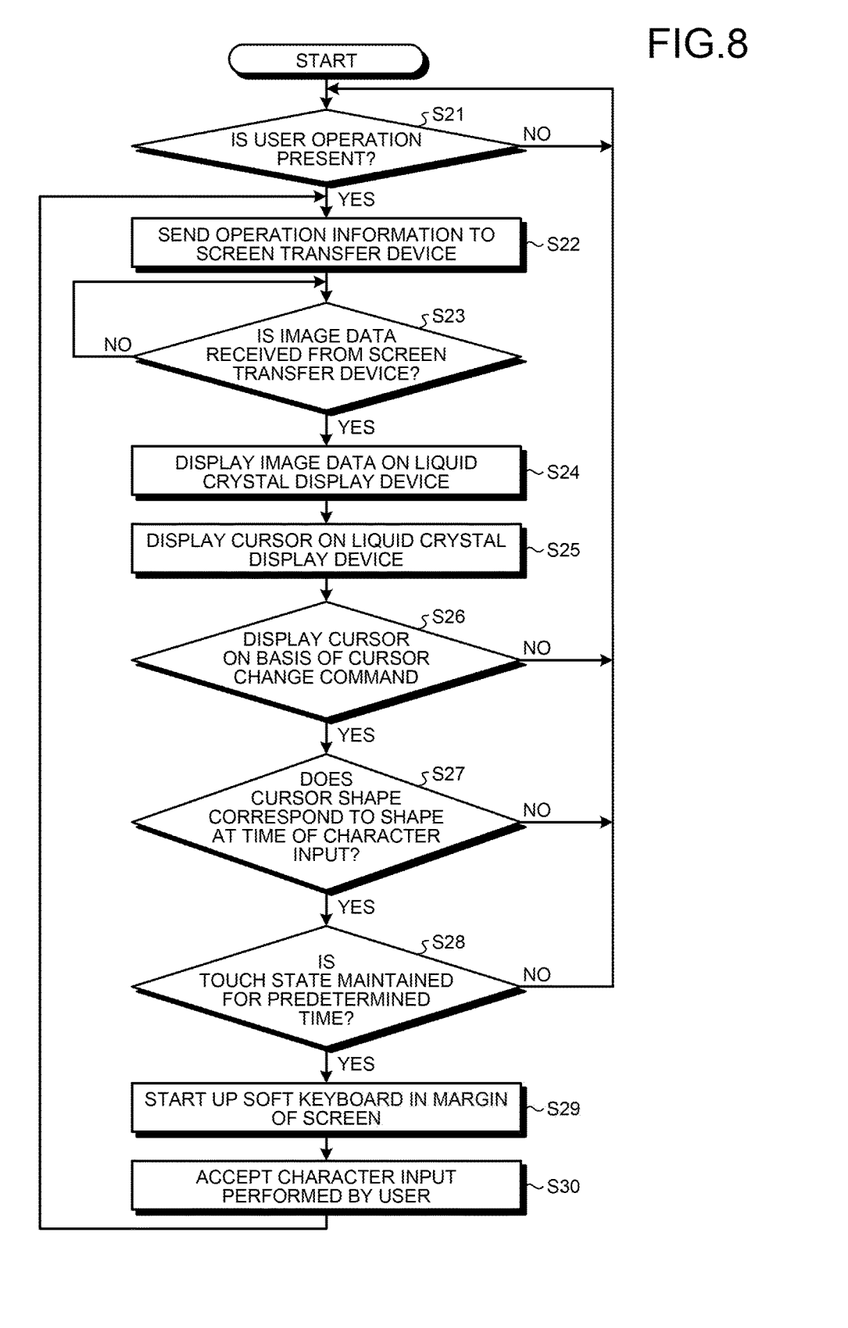
FIG. 8 is a flowchart illustrating the flow of a screen process performed by a mobile terminal.

In the following, the flow of the screen process performed by the mobile terminal 3 will be described. FIG. 8 is a flowchart illustrating the flow of a screen process performed by the mobile terminal 3. As illustrated in FIG. 8, the mobile terminal 3 determines whether a user operation is present (Step S21) and, if no user operation is present, the mobile terminal 3 repeats the determination until the user operation is present.

Then, if the user operation is present, the mobile terminal 3 sends the operation information to the screen transfer device 5 (Step S22). Thereafter, the mobile terminal 3 determines whether image data is received from the screen transfer device 5 (Step S23) and, if the image data is not received, the mobile terminal 3 repeats the determination until the mobile terminal 3 receives the image data.

Then, when the mobile terminal 3 receives the image data from the screen transfer device 5, the mobile terminal 3 displays the image data on the liquid crystal display device (Step S24). Thereafter, the mobile terminal 3 receives the cursor image data command or the cursor change command and displays the cursor on the liquid crystal display device (Step S25). Then, the mobile terminal 3 determines whether the mobile terminal 3 displays the cursor on the basis of the cursor change command (Step S26) and, if the mobile terminal 3 displays the cursor on the basis of the cursor image data command instead of the cursor change command, the mobile terminal 3 returns to Step S21.

In contrast, if the mobile terminal 3 displays the cursor on the basis of the cursor change command, the mobile terminal 3 determines whether, on the basis of the cursor change command, the cursor shape is the shape at the time of the character input (Step S27). Consequently, if the cursor shape is not the shape at the time of the character input, the mobile terminal 3 returns to Step S21.

In contrast, if the cursor shape is the shape at the time of the character input, the mobile terminal 3 determines whether the touch state is maintained for the predetermined time (Step S28) and, if the touch state is not maintained for the predetermined time, the mobile terminal 3 returns to Step S21.

In contrast, if the touch state is maintained for the predetermined time, the mobile terminal 3 starts up the soft keyboard 2 in the margin of the screen (Step S29) and accepts a character input performed by the user (Step S30). Then, the mobile terminal 3 returns to Step S21.

In this way, because the mobile terminal 3 starts up the soft keyboard 2 if the changed cursor shape is the shape at the time of the character input and the touch state is maintained for the predetermined time, the user does not need to manually start up the soft keyboard 2 and thus it is possible to reduce the load applied to the user.

As described above, in the embodiment, the extracting unit 56 in the screen transfer device 5 extracts the cursor information from the drawing command and the detecting unit 57 detects a change in the cursor shape on the cursor information. Then, if the cursor shape is changed, the change command sending unit 58 sends the cursor change command to the mobile terminal 3. Then, the startup determination unit 36 in the mobile terminal 3 determines whether the soft keyboard 2 is started up on the basis of the change in the cursor shape and on the basis of the time period for which the touch state is maintained. If the startup determination unit 36 determines that the soft keyboard 2 is started up, the startup determination unit 36 instructs the startup unit 37 to start up the soft keyboard 2.

Accordingly, when the user performs a character input, the user does not need to manually start up the soft keyboard 2 by only touching the character input entry field 42 for the predetermined time and thus it is possible to reduce the load applied to the user.

Furthermore, in the embodiment, the screen transfer device 5 has been described; however, it is possible to obtain a screen transfer control program having the same function as that performed by the screen transfer device 5 by implementing the configuration held by the screen transfer device 5 by software. Accordingly, a computer that executes the screen transfer control program will be described.

Figure 9:
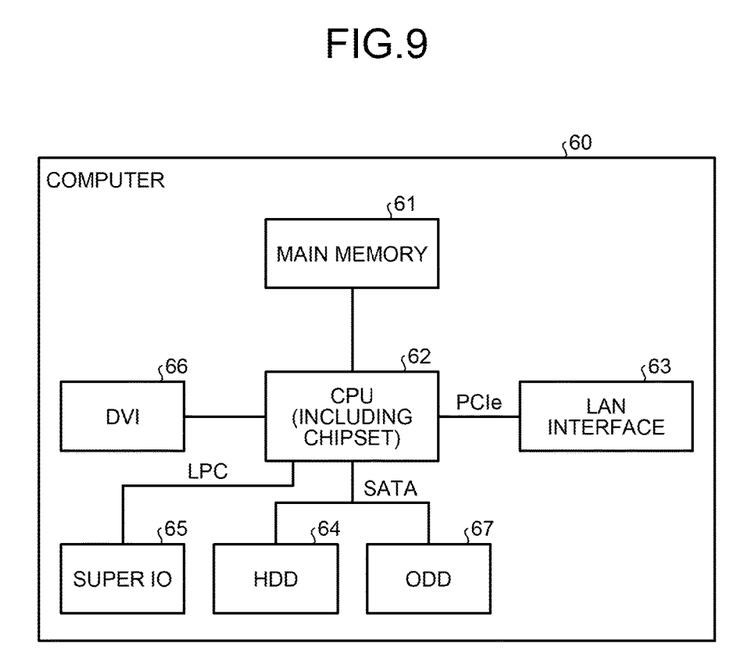
FIG. 9 is a schematic diagram illustrating the hardware configuration of a computer that executes a screen transfer control program according to the embodiment.

FIG. 9 is a schematic diagram illustrating the hardware configuration of a computer that executes a screen transfer control program according to the embodiment. As illustrated in FIG. 9, a computer 60 includes a main memory 61, a CPU 62, a Local Area Network (LAN) interface 63, and an HDD 64. Furthermore, the computer 60 includes a super input/output (IO) 65, a Digital Visual Interface (DVI) 66, and an Optical Disk Drive (ODD) 67.

The main memory 61 is a memory that stores therein programs, intermediate results of the programs, or the like. The CPU 62 is a central processing unit that reads a program from the main memory 61 and executes the program. The CPU 62 includes a chipset that has a memory controller.

The LAN interface 63 is an interface for connecting the computer 60 to another computer via a LAN. The HDD 64 is a disk device that stores therein programs and data and the super IO 65 is an interface for connecting an input device, such as a mouse, a keyboard, or the like. The DVI 66 is an interface for connecting a liquid crystal display device and the ODD 67 is a device that reads and writes a DVD.

The LAN interface 63 is connected to the CPU 62 by a PCI Express (PCIe). The HDD 64 and the ODD 67 are connected to the CPU 62 by a serial advanced technology attachment (SATA). The super IO 65 is connected to the CPU 62 by a low pin count (LPC).

Then, the screen transfer control program executed by the computer 60 is stored in the DVD, is read from the DVD by the ODD 67, and is installed in the computer 60. Alternatively, the screen transfer control program is stored in databases or the like in other computer systems connected via the LAN interface 63, is read from these databases, and is installed in the computer 60. Then, the installed data processing program is stored in the HDD 64, is read by the main memory 61, and is executed by the CPU 62.

Furthermore, by implementing the configuration of the mobile terminal 3 by software, it is possible to obtain a screen processing program that has the same function as that performed by the mobile terminal 3. Accordingly, a computer that executes the screen processing program will be described.

Figure 10:
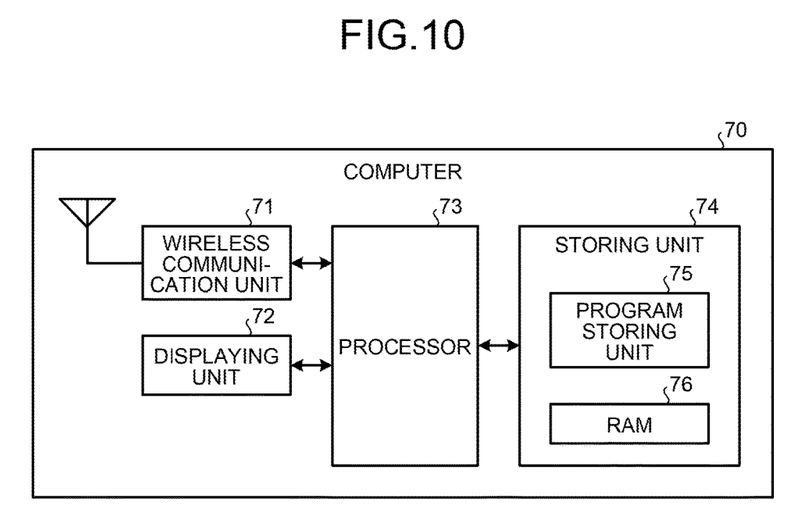
FIG. 10 is a schematic diagram illustrating the hardware configuration of a computer that executes a screen processing program according to the embodiment.

FIG. 10 is a schematic diagram illustrating the hardware configuration of a computer that executes a screen processing program according to the embodiment. As illustrated in FIG. 10, a computer 70 includes a wireless communication unit 71, a displaying unit 72, a processor 73, and a storing unit 74. The wireless communication unit 71, the displaying unit 72, and the storing unit 74 are connected to the processor 73.

The wireless communication unit 71 performs wireless communication, such as LTE, WiMAX, and the like. The displaying unit 72 is a liquid crystal display device that displays a screen and that accepts a touch operation of a user.

The storing unit 74 includes a program storing unit 75 and a random access memory (RAM) 76. The program storing unit 75 stores therein programs, such as the screen processing program or the like. The RAM 76 stores therein data or the like that is created by execution of the programs.

The processor 73 is, for example, an electronic circuit, such as an Application Specific Integrated Circuit (ASIC), a central processing unit (CPU), micro processing unit (MPU), or the like. Then, the processor 73 reads the program, such as the screen processing program or the like, from the program storing unit 75 and loads the program in the RAM 76, whereby the program, such as the screen processing program or the like, functions as the mobile terminal 3 illustrated in FIG. 2.

As an aspect of an embodiment, it is possible to reduce the load applied to a user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A screen transfer control system comprising:
 a business device configured to perform a business process;
 a mobile terminal configured to be used by a user as an input-output device of the business device; and
 a screen transfer control device configured to convert a business screen, which is output by the business device, to image data and that sends the image data to the mobile terminal, wherein the screen transfer control device includes
   a receiving circuit that receives drawing command that is output in order for the business device to display the business screen on the mobile terminal,
   a first sending circuit that converts, on the basis of the drawing command received by the receiving circuit, the business screen to the image data and that sends the image data to the mobile terminal,
   a detecting circuit that detects a change in the cursor shape on the basis of cursor information that is included in the drawing command received by the receiving circuit, and
   a second sending circuit that sends, when a change in the cursor shape is detected by the detecting circuit, change information related to the change to the mobile terminal, and
the mobile terminal includes
   a displaying circuit that receives the image data sent by the first sending circuit and that displays the image data,
   a first determination circuit that determines, on the basis of the change information sent by the second sending circuit, whether the cursor shape is changed to the cursor shape for a character input,
   a second determination circuit that determines, when the first determination circuit determines that the cursor shape is changed to the cursor shape for the character input, whether a screen touch that made the change in the cursor shape continues for a predetermined time, and
   a startup circuit that starts up a software keyboard when the second determination circuit determines that the screen touch continues for the predetermined time.

2. The screen transfer control system according to claim 1, wherein the predetermined time is equal to or greater than a first threshold and less than a second threshold.

3. The screen transfer control system according to claim 2, wherein the first threshold is 500 milliseconds and the second threshold is 1500 milliseconds.

4. A non-transitory computer-readable recording medium having stored therein a screen transfer control program that causes a computer to execute a process comprising:
   receiving drawing command that is output in order for a business device to display a business screen on a mobile terminal;
   converting the business screen to image data on the basis of the received drawing command and sending the image data to the mobile terminal;
   detecting a change in a cursor shape on the basis of cursor information that is included in the received drawing command; and
   sending, when the change in the cursor shape is detected, change information related to the change to the mobile terminal.

5. A screen transfer control method used in a screen transfer control system, the method comprising:
   receiving, by a screen transfer control device, drawing command that is output in order for a business device to display a business screen on a mobile terminal;
   converting, by a processor of the screen transfer control device on the basis of the received drawing command, the business screen to image data and sending the image data to the mobile terminal;
   detecting, by the processor of the screen transfer control device, a change in a cursor shape on the basis of cursor information included in the received drawing command;
   sending, by the screen transfer control device when the change in the cursor shape is detected, change information related to the change to the mobile terminal;
   receiving, by the mobile terminal, the image data and displaying the image data;
   determining, by a processor of the mobile terminal on the basis of the change information, whether the cursor shape is changed to the cursor shape for a character input;
   determining, by the processor of the mobile terminal when it is determined that the cursor shape is changed to the cursor shape for the character input, whether a screen touch, which is performed by a user, that made the change in the cursor shape continues for a predetermined time; and
   starting up, by the mobile terminal, a software keyboard when it is determined that the screen touch continues for the predetermined time.

* * * * *